Figure 1:
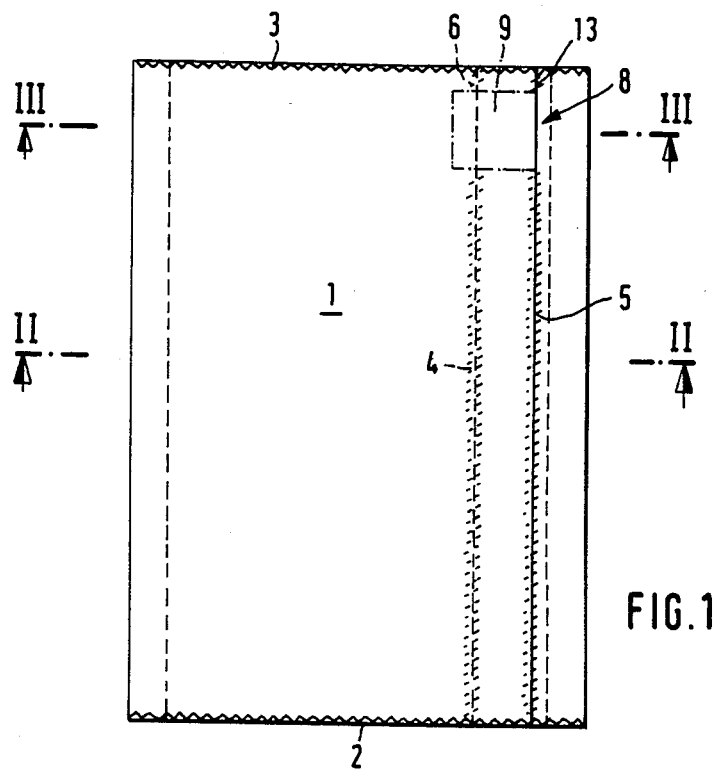

United States Patent [19]

Achelpohl

[11] Patent Number: 4,566,131
[45] Date of Patent: Jan. 21, 1986

[54] VALVED BAG

[75] Inventor: Fritz Achelpohl, Lengerich, Fed. Rep. of Germany

[73] Assignee: Windmoller & Holscher, Lengerich, Fed. Rep. of Germany

[21] Appl. No.: 625,213

[22] Filed: Jun. 25, 1984

[30] Foreign Application Priority Data

Jun. 30, 1983 [DE] Fed. Rep. of Germany ....... 3323587

[51] Int. Cl.$^4$ .............................................. B65D 30/29
[52] U.S. Cl. ........................................ 383/44; 383/52
[58] Field of Search ............................. 383/44, 45, 52

[56] References Cited

U.S. PATENT DOCUMENTS

| | | | |
|---|---|---|---|
| 3,040,967 | 6/1962 | Klein | 383/52 |
| 3,371,849 | 3/1968 | Rochla | 383/44 |
| 3,394,871 | 7/1968 | Williams et al. | 383/44 |
| 3,410,300 | 11/1968 | Mondano | 383/52 |
| 3,456,868 | 7/1969 | Snabb et al. | 383/45 |
| 3,833,166 | 9/1974 | Murray | 383/44 |

FOREIGN PATENT DOCUMENTS 1327508  4/1963  France .................... 383/44

Primary Examiner—Stephen P. Garbe
Attorney, Agent, or Firm—Fleit, Jacobson, Cohn & Price

[57] ABSTRACT

A valved bag consists of a collapsed section of a tubular plastic film, which has been formed in that the side portions of a plastic film web have been infolded to overlap each other and which has been provided with transverse top and bottom seam welds and in the overlap area of the side portions has been provided with two spaced apart parallel longitudinal seams, which join only said side portions and terminate or are interrupted at a distance from the top seam weld so as to provide a filling passage. In order to simplify the manufacture of the valved bags, the longitudinal seams consist of strips of adhesive and are in contact with both side portions of the film web at both edges of the overlap area. One of said side portions is provided with an adhesive bond-inhibiting agent adjacent to the filling passage at least across the strip of adhesive.

6 Claims, 6 Drawing Figures

VALVED BAG

This invnetion relates to a valved bag consisting of a collapsed section of a tubular plastic film, which has been formed in that the side portions of a plastic film web have been infolded to overlap each other and which has been provided with transverse top and bottom seam welds and in the overlap area of the side portions has been provided with two spaced apart parallel longitudinal seams, which join only said side portions and terminate or are interrupted at a distance from the top seam weld so as to provide a filling passage.

A valved bag of this kind is disclosed in German Patent Application No. P 33 12 925.8, which is no prior publication. In that known valved bag the longitudinal seams consist of longitudinal seam welds so that special measures must be adopted to ensure that the overlapping side portions will not be joined by welding across the filling passage and will not be welded to the opposite wall of the bag.

For this reason it is an object of the invention to provide a valved bag which is of the kind described first hereinbefore and can be made more easily.

This object is accomplished by the provision of a valved bag which is of the kind described first hereinbefore and in which the longitudinal seams consist of strips of adhesive and are in contact with both side portions of the film web at both edges of the overlap area, and one of said side portions is provided with an adhesive bond-inhibiting agent adjacent to the filling passage at least across the strips of adhesive.

The valved bag in accordance with the invention can be made in a simpler manner in a process in which continuous strips of adhesive are applied to a plastic film web, from which a collapsed tubular plastic film is subsequently formed in that side portions of the web are infolded to overlap each other. Only adjacent to the filling passage, are said strips of adhesive bridged by an adhesive bond-inhibiting agent. Different from a seam weld, the strips of adhesive can adhesively join only those walls of the tubular plastic film which are in contact with each other. For this reason the adhesive is applied to the plastic film web adjacent to both edges of the overlap area so that the two plies of the tubular plastic film which constitute a wall portion of the bag will be substantially uniformly stressed.

In the valve bag in accordance with the invention the overlapped portion of the inner side portion constitutes adjacent to the filling passage a valve lip. Because the tubular plastic film which constitutes the wall of the bag comprises two plies adjacent to said lip, the latter is sufficiently flexible and soft for tightly sealing the filling passage under the internal pressure of the contents of the bag. That sealing lip will be sufficiently flexible even if the collapsed tubular plastic film which constitutes the wall of the bag has a uniform wall thickness throughout.

To permit the application of continuous strips of adhesive to the plastic film web which is subsequently transformed to a tubular film, the plastic film web is covered on one side portion of the film web with an adhesive bond-inhibiting agent, which extends across the area in which the filling passage will subsequently be formed. Said adhesive bond-inhibiting agent may comprise a silicone composition.

Instead of a adhesive bond-inhibiting agent applied in liquid form, a reversely folded adhesive bond-inhibiting slip provided with a silicone coating or the like may be joined by means of a pressure-sensitive adhesive to one side portion of the plastic film web in the area in which the filling passage will subsequently be formed. Said adhesive bond-inhibiting slip has a lower leg, which protrudes to the outside of the bag from the area in which the side portions of the plastic film web overlap. When the bag has been filled, that leg of the adhesive bond-inhibiting slip which protrudes from the valve passage to the outside can be pulled in such a manner that the coating of pressure-sensitive adhesive is retained on one wall of the filling passage and the filling passage can be sealed in that the superimposed walls defining the filling passage are forced against each other so that they are adhesively joined.

Figure 2:
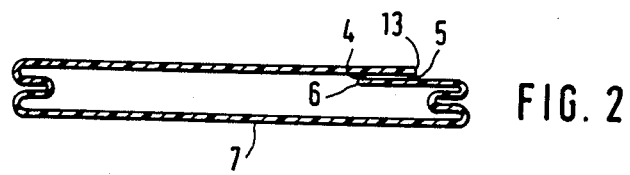
Figure 3:
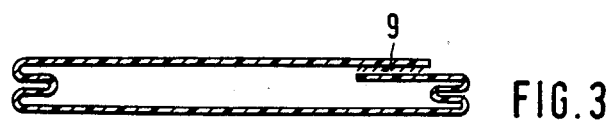
Figure 4:
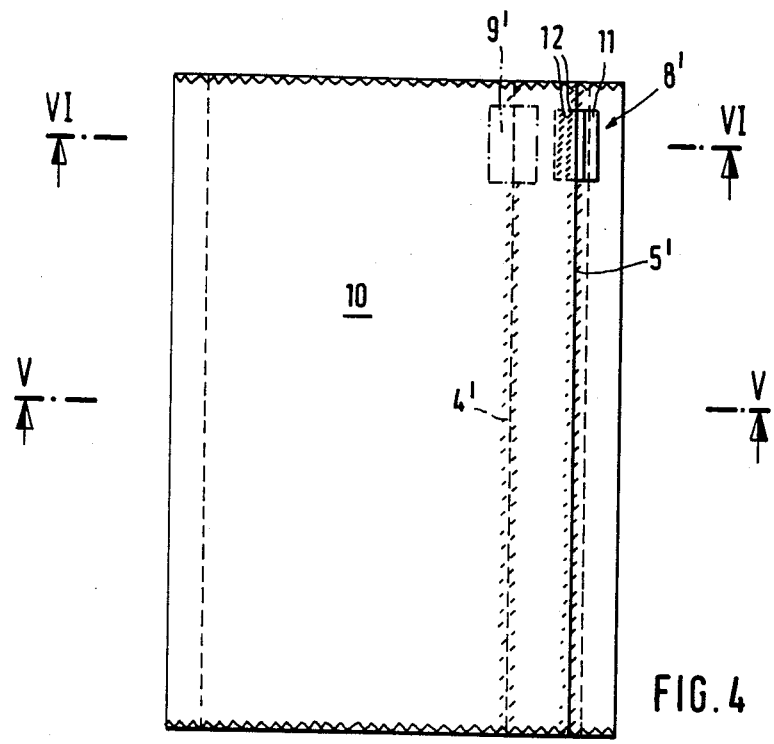
Figure 5:
Figure 6:
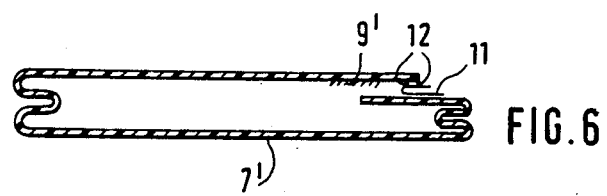

An illustrative embodiment of the invention will now be described in more detail with reference to the drawing, in which FIG. 1 is a top plan view showing a valved bag, which has side gussets and a double-ply wall portion and has been formed from a collapsed tubular plastic film, FIG. 2 is a sectional view taken on line II—II in FIG. 1, FIG. 3 is a sectional view taken on line III—III in FIG. 1, FIG. 4 is a top plan view showing a different embodiment of a valved bag, which has also walls consisting of a collapsed tubular plastic film, FIG. 5 is a sectional view taken on line V—V in FIG. 4 and FIG. 6 is a sectional view taken on line VI—VI in FIG. 4.

The valved bag shown in the drawings has been formed in that the side portions of a plastic film web have been infolded to overlap each other and has been provided with side gussets. The valved bag is closed at its top and bottom ends by a bottom seam 2 and a top seam 3, respectively, which consist of transverse seam welds. Because the valved bags are made from a tubular film, the top and bottom seam welds may consist of transverse seams formed by hot-wire welding or of seam welds with intervening transverse score lines.

In the area in which the infolded side portions of the plastic film web overlap, said side portions are joined to each other by two spaced apart strips 4 and 5 of adhesive, which contact both side portions at the edges 6, 13 of the overlap area. As a result, the two walls of the tubular film 7 will be uniformly stressed by forces exerted thereon.

The glue strips 4, 5 extend throughout the length of the valved bag 1. An adhesive bond-inhibiting agent 9 consisting, e.g., of a silicone composition, has been applied to a predetermined area adjacent to the valve opening 8 before the side portions of the plastic film web have been infolded so that there will be no adhesion across the width of the valve passage in spite of the fact that the glue strips 4, 5 are continuous.

The valved bag 10 shown in FIGS. 4 to 6 differs from the valved bag shown in FIGS. 1 to 3 only in that an adhesive bond-inhibiting agent 9' has been applied only across the adhesive seam 4' in the region of the valve 8'. A reversely folded adhesive bond-inhibiting slip 11 has been provided in that region of the valve 8' through which the adhesive seam 5' extends. That adhesive bond-inhibiting slip 11 consists of paper, which is coated with silicone on the outside, and is joined by means of a pressure-sensitive adhesive 12 to the outer side portion 7' of the film web in the overlap area. The inner or lower leg of the reversely folded slip 11 protrudes to the outside of the bag from the filling passage so that the slip 11 can be pulled off when the bag has been filled. In that case the pressure-sensitive adhesive is retained on one wall of the filling passage, which can then be closed by the application of pressure.

The coating 12 of pressure-sensitive adhesive is suitably spaced from the strip 5' of adhesive so that the adhesive power of the coating of pressure-sensitive adhesive cannot be adversely affected by the application of a strip of adhesive at an elevated temperature.

What is claimed is:

1. A valved bag comprising a section of a plastic film web, in which side portions of the plastic film web have been infolded to overlap each other and in which the film web has been provided with transverse top and bottom seams, and in an overlap area of the side portions has been provided with two spaced apart parallel longitudinal seams, which join only said side portions, the longitudinal seams comprising portions of respective strips of adhesive extending essentially between the transverse seams of the film web and in contact with both side portions of the film web at respective edges of the overlap area of the side portions, with at least a part of one of said side portions being provided with a slip of material which includes an adhesive bond-inhibiting leg portion and which is joined by means of a pressure-sensitive adhesive to the one side portion, with the leg portion of said slip of material extending across adjacent adhesive and protruding to the outside of the bag from the area in which the side portions of the film web overlap, such that the slip of material precludes the part of the one side portion and an opposed part of the other side portion from being joined by the adjacent adhesive and thereby defines at least a portion of a filling passage for the bag.

2. A valved bag according to claim 1, wherein the bag includes reverse folded gussets at opposite sides thereof.

3. A valved bag according to claim 1, wherein the slip of material is reverse folded and the adhesive bond-inhibiting leg portion is coated with silicone or the like.

4. A valved bag comprising a section of a plastic film web, in which side portions of the plastic film web have been infolded to overlap each other and in which the film web has been provided with transverse top and bottom seams, and in an overlap area of the side portions has been provided with two spaced apart parallel longitudinal seams, which join only said side portions, the longitudinal seams comprising portions of respective strips of adhesive extending essentially between the transverse seams of the film web and in contact with both side portions of the film web at respective edges of an overlap area of the side portions, with at least one of said side portions being provided with an adhesive bond-inhibiting agent in a predetermined area extending at least across a portion of an inner one of the strips of adhesive, and one of said side portions also being provided with a slip of material which is adhered to the film by a pressure sensitive adhesive and which has an adhesive bond-inhibiting leg portion that extends across an outer one of the strips of adhesive and protrudes from the filling passage to the outside of the bag, such that respective opposed parts of the side portions are not joined by the strips of adhesive and define a filling passage for the bag.

5. A valved bag according to claim 4, wherein the adhesive bond-inhibiting agent is a covering of silicone or the like which is provided on the one side portion of the plastic film web.

6. A valved bag according to claim 5, wherein the slip of material is reverse folded and the adhesive bond-inhibiting leg portion is coated with silicone or the like.

* * * * *